United States Patent
Heckt et al.

(10) Patent No.: US 9,170,038 B2
(45) Date of Patent: Oct. 27, 2015

(54) AIR CONDITIONING UNIT FOR VEHICLES AND METHOD OF OPERATING THE SAME

(75) Inventors: Roman Heckt, Aachen (DE); Marc Graaf, Krefeld (DE); Tobias Haas, Cologne (DE)

(73) Assignee: Halla Visteon Climate Control Corporation, Daejeon-si (KR)

( * ) Notice: Subject to any disclaimer, the term of this patent is extended or adjusted under 35 U.S.C. 154(b) by 1139 days.

(21) Appl. No.: 11/755,338

(22) Filed: May 30, 2007

(65) Prior Publication Data
US 2007/0283703 A1    Dec. 13, 2007

(30) Foreign Application Priority Data

May 31, 2006    (DE) .......................... 10 2006 026 359

(51) Int. Cl.
| | |
|---|---|
| B60H 1/00 | (2006.01) |
| F25B 6/00 | (2006.01) |
| F25B 41/04 | (2006.01) |
| B60H 1/32 | (2006.01) |
| F24F 3/153 | (2006.01) |
| F25B 9/00 | (2006.01) |
| F25B 40/00 | (2006.01) |

(52) U.S. Cl.
CPC ............ *F25B 41/04* (2013.01); *B60H 1/00907* (2013.01); *B60H 1/3227* (2013.01); *F24F 3/153* (2013.01); *B60H 2001/00957* (2013.01); *F25B 9/008* (2013.01); *F25B 40/00* (2013.01); *F25B 2309/061* (2013.01); *F25B 2600/2501* (2013.01)

(58) Field of Classification Search
CPC ........ B60G 1/02; B60G 1/00899; B60G 1/22; B60H 1/00907; B60H 1/3227; B60H 2001/00957; B60H 1/00; F24F 3/153; F25B 41/04; F25B 2600/2501; F25B 40/00; F25B 2309/061; F25B 9/008
USPC ...................... 62/324.1, 324.6, 498, 513, 244
See application file for complete search history.

(56) References Cited

U.S. PATENT DOCUMENTS

| | | | |
|---|---|---|---|
| 5,299,431 A | 4/1994 | Iritani et al. | |
| 6,928,831 B2 * | 8/2005 | Heyl ............................. | 62/324.1 |
| 7,231,776 B2 * | 6/2007 | Casar et al. ..................... | 62/244 |
| 2005/0204768 A1* | 9/2005 | Di Vito et al. ................ | 62/324.1 |

FOREIGN PATENT DOCUMENTS

| | | |
|---|---|---|
| DE | 101 26 257 A1 | 5/2001 |
| DE | 101 63 607 A1 | 12/2001 |
| DE | 102 40 795 A1 | 8/2002 |

\* cited by examiner

*Primary Examiner* — Mohammad M Ali
(74) *Attorney, Agent, or Firm* — Fraser Clemens Martin & Miller LLC; James D. Miller

(57) ABSTRACT

An air conditioning unit for a combined refrigeration plant and heat pump mode of operation for vehicles is disclosed, wherein the air conditioning unit includes a primary circuit and a secondary passage, and a power consumption required by the air conditioning unit to heat the passenger compartment is minimized.

12 Claims, 1 Drawing Sheet

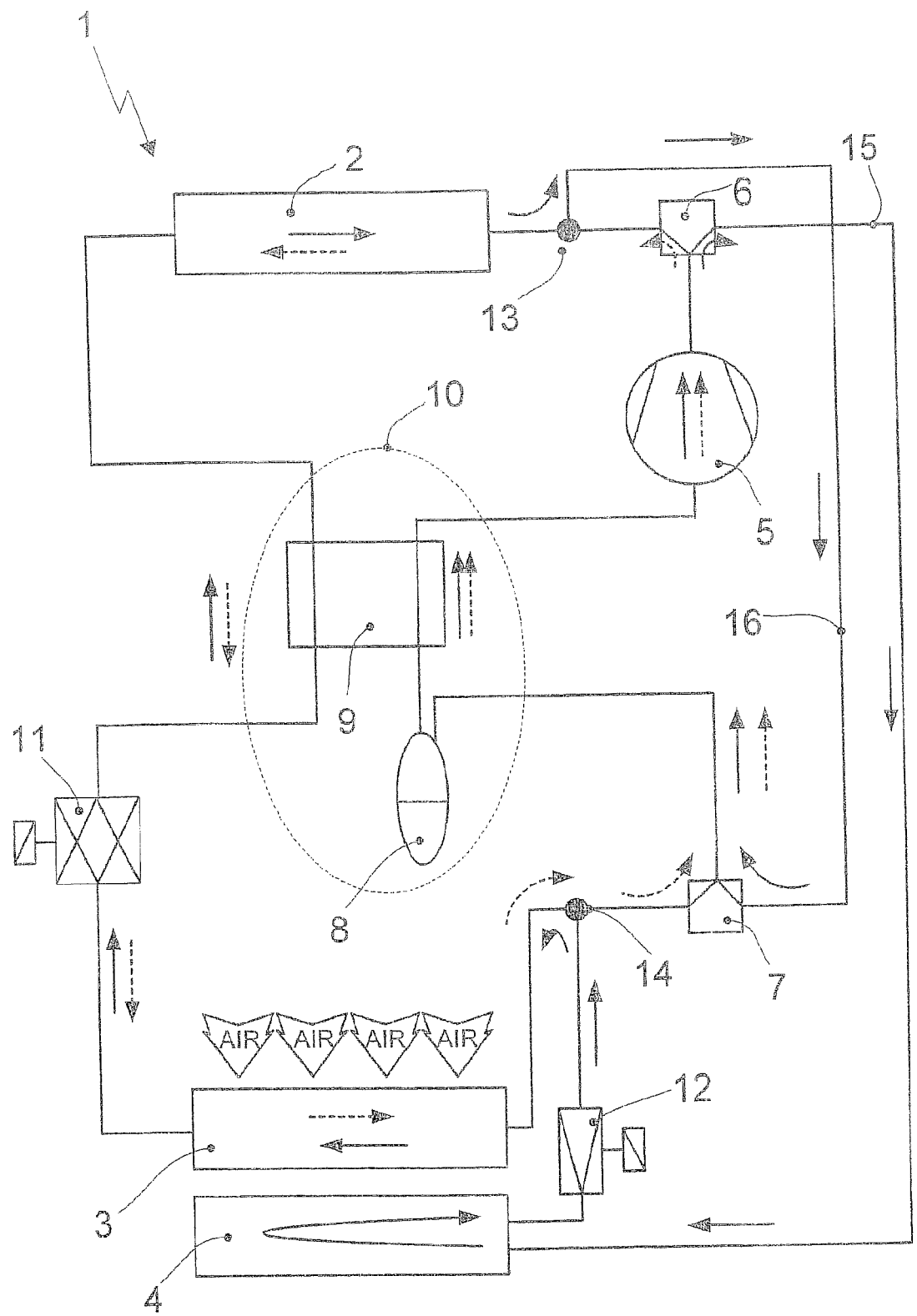

AIR CONDITIONING UNIT FOR VEHICLES AND METHOD OF OPERATING THE SAME

CROSS-REFERENCE TO RELATED APPLICATION

This application claims the benefit of German Patent Application No. 102006026359.6-16 AIC CONDITIONING UNITED FOR VEHICLES AND METHOD FOR OPERATING THEREOF filed on May 31, 2006, hereby incorporated herein by reference in its entirety.

FIELD OF THE INVENTION

The invention relates generally to an air conditioning unit for vehicles. More particularly, the invention relates to an air conditioning unit for a combined refrigeration plant and heat pump operation for vehicles for heating, cooling and dehumidifying air to be supplied to a passenger compartment.

BACKGROUND OF THE INVENTION

To condition air to be supplied to a passenger compartment, prior art air conditioning systems include a refrigeration plant for cooling the air and a glycol-air heat exchanger for heating the air. These systems also typically include glycol-air heat pumps and air-air heat pumps.

Air conditioning units having glycol-air heat exchangers are disadvantageous in that when ambient air temperatures fall below 10° C., cooling water, as well as a glycol temperature cannot reach the temperature level required for comfortably heating the passenger compartment. Against a backdrop of increasing employment of vehicle drive systems which release a minimal amount of heat, such as electric or fuel cell drives, use of additional heaters is necessary.

It is inherent in glycol-air heat pumps that the cooling water of the internal combustion engine is utilized as heat source. However, heat extraction from the cooling water leads to the engine being operated at low temperatures for longer periods of time, which is undesirable.

If air-air heat pumps are used as heaters, ice builds up at a gas cooler or condensator at certain temperatures. Control of the system can prevent icing, but can also result in a minimization of heat output from the heat pump. If ice build-up at the gas cooler or condensator is permitted, the heat pump can be actively defrosted by operating the refrigerant circuit as an A/C-plant for a short time. However, this may result in a minimization of mean heat output of the heat pump.

Frequently, heat pump systems cannot dehumidify and heat the air to be fed into the passenger compartment at the same time. Therefore the systems cannot be operated with recirculated air from the passenger compartment, which may lead to undesired fogging of the windows. Additionally, heat pump systems delivering output to the engine cooling circuit frequently are insufficiently dynamic and efficient.

An air conditioning unit for vehicles is disclosed in DE 101 63 607 A1, hereby incorporated herein by reference in its entirety, having an integrated heat pump for cooling air and heating air, wherein refrigerant is circulated in a circuit and heat transmission is facilitated to air flowing into a passenger compartment. In this process, energy is fed directly into the air flowing into the passenger compartment by use of the integrated heat pump. This is facilitated by use of refrigerant-passed heat exchangers disposed in the vehicle's air conditioning box by cooling and optionally condensing the refrigerant for heating and evaporating the refrigerant for cooling. Next, the integrated heat pump energy is fed into the air flowing into the passenger compartment indirectly over heat carrier liquids. This is facilitated by use of liquid/air heat exchangers disposed in the vehicle's air conditioning box, by cooling the secondary refrigerant for heating the air and by heating the secondary refrigerant for cooling the air. It is a disadvantage of this invention that in heat pump mode of operation, the internal heat exchanger is not passed on the high-pressure side and a great number of components are required.

DE 101 26 257 A1, hereby incorporated herein by reference in its entirety, discloses a heating/cooling circuit for vehicles, whereby the heating/cooling circuit comprises an evaporator for cooling air to be fed to an interior, a heating heat exchanger for heating the air to be fed to the interior, an external heat exchanger with a compressor for discharging a refrigerant, a first expansion element allocated to the evaporator, a second expansion element allocated to the external heat exchanger, and refrigerant conduits connecting the components to each other. The invention provides means to adjust the pressure of the refrigerant in the external heat exchanger between highest and lowest system pressures to establish an effective, energy-saving, demand-oriented dehumidification of the air in cooling, heating and reheating modes of operation. Loading of the external heat exchanger with medium pressure, however, results in minimized performance of the external heat exchanger and a minimized efficiency of the heating/cooling circuit.

It would be desirable to produce an air conditioning unit for a combined refrigeration plant and heat pump mode of operation for vehicles, wherein a power consumption required to heat/cool the passenger compartment is minimized and a heating/cooling facilitated thereby is maximized.

SUMMARY OF THE INVENTION

Harmonious with the present invention, an air conditioning unit for a combined refrigeration plant and heat pump mode of operation for vehicles, wherein a power consumption required to heat/cool the passenger compartment is minimized and a heating/cooling facilitated thereby is maximized, has surprisingly been discovered.

In one embodiment, an air conditioning system comprises: a primary circuit including a compressor, a first heat exchanger for heat transmission from a refrigerant to the environment, a first throttling element, and a second heat exchanger for heat transmission from the refrigerant to air to be supplied to a passenger compartment; and a secondary passage including a third heat exchanger for heat transmission from the refrigerant to the air to be supplied to the passenger compartment and a second throttling element.

In another embodiment, an air conditioning system comprises: a primary circuit including a compressor, a first heat exchanger for heat transmission from a refrigerant to the environment, a first throttling element, and a second heat exchanger for heat transmission from the refrigerant to air to be supplied to a passenger compartment; and a secondary passage including a first portion and a second portion, the first portion extending from a first branch point disposed between the compressor and the first heat exchanger to an entering point disposed between the second heat exchanger and the compressor and including a third heat exchanger for heat transmission from the refrigerant to air to be conditioned in the passenger compartment and a second throttling element disposed downstream of the third heat exchanger, the second portion extending from a second branch point disposed between the first heat exchanger and the compressor to an entering point disposed between the second heat exchanger and the compressor.

A method for operating an air conditioning system for a combined refrigeration plant and heat pump mode of operation is disclosed, comprising the steps of: providing an air conditioner system including a primary circuit having a compressor, a first heat exchanger for heat transmission from a refrigerant to the environment, a first throttling element, and a second heat exchanger for heat transmission from the refrigerant to air to be supplied to a passenger compartment, and a secondary passage including a third heat exchanger for heat transmission from the refrigerant to air to be conditioned in the passenger compartment and a second throttling element disposed downstream of the third heat exchanger, wherein while in a refrigeration plant mode, the refrigerant flows through the primary circuit, and while in heat pump mode the refrigerant flows through both the primary circuit and the secondary passage, whereby the air to be supplied to the passenger compartment is cooled and dehumidified in the second heat exchanger and heated in the third heat exchanger.

According to the invention, the problem is solved by an air conditioning unit for the combined refrigeration plant and heat pump operation for vehicles provided with a primary circuit and a secondary passage. The primary circuit comprises the components known from a traditional compression refrigeration machine, namely a compressor, a heat exchanger, or first gas cooler, respectively, to transmit heat from the refrigerant to the environment, a throttling element and a heat exchanger, or evaporator, respectively, to supply heat from the air to be supplied to the passenger compartment to the refrigerant. The secondary passage according to the invention has two portions, whereby the first portion extends starting from a branch point disposed between the compressor and the heat exchanger up to an entering point disposed between the heat exchanger and the compressor. In said first portion, a heat exchanger for heat transmission from the refrigerant to the air to be supplied to the passenger compartment and a subsequent second throttling element are located. The second portion extends starting from another branch point disposed between the heat exchanger and the compressor up to another entering point disposed between the heat exchanger and the compressor.

In an advantageous embodiment of the invention, the additional heat exchanger of the secondary passage is established as second gas cooler, wherein the air to be supplied to the passenger compartment, supplied as recirculated or fresh air, is heated. Thus, in addition to the heat exchanger established as first gas cooler, a separate second gas cooler is available for heat transmission from the refrigerant to the environment. Further, the heat exchanger provided to supply heat from the air to be supplied to the passenger compartment to the refrigerant is established as evaporator.

By use of the means for directing the refrigerant described below, the air conditioning unit, which having reduced complexity is continuously operable in heat pump mode of operation, makes possible to heat the passenger compartment in recirculating mode.

By optimized operation of the air conditioning unit according to the invention, first, disadvantageous ice build-up at the gas cooler, which is disposed in the primary circuit, is avoided and, second, intermittent operation for preventing the gas cooler from icing, or active defrosting, respectively, is not necessary. Another advantage of the invention is the fact that no cooling of the engine refrigerant occurs, which would cause increased emission and fuel consumption such as in glycol-air heat pumps.

In order to improve the refrigerating capacity by additional overheating and cooling of the refrigerant of the air conditioning unit according to the invention, an inner heat exchanger is provided which on both the high-pressure and the low-pressure sides is passed by the refrigerant in the heat pump mode as well as in the refrigeration plant mode.

In an advantage embodiment of the invention, on the low-pressure side between the entering point and the inner heat exchanger an accumulator is provided for separating and storing refrigerant. In order to reduce space requirements of the air conditioning unit, the inner heat exchanger and the accumulator can also be configured as single-piece combined component.

The above mentioned means for directing the refrigerant make possible to switch over between both heat pump and refrigeration plant modes of operation of the air conditioning unit. Preferably, at least a branch point is established as active switch-over valve and an entering point as passive switch-over valve. In place of the active switch-over valve, two single switch-off valves may be provided. Also alternatively, in place of the passive switch-over valve, a selective switch, for example, may be used.

An especially advantageous embodiment of the invention is to establish the first throttling element as bidirectionally passable throttle valve with two flow paths loadable by the refrigerant in opposite senses. Although the direction of flow of the refrigerant in heat pump operation is opposite to the refrigeration plant operation, the bidirectionally passable throttle valve allows to refrain from using an additional second throttle valve. It is also within the scope of the invention, if despite of the clear advantages provided by a throttle valve with two flow paths loadable opposite-sense by the refrigerant, two separated throttle valves are used.

The second throttling element provided for creating a medium pressure is configured to have a fixed cross-section that is as fixed throttle, or preferably, having an adjustable cross-section. By active control of the cross-section of the throttling element, which is preferably established as throttle valve, ice build-up at the evaporator and flash fogging, or sudden fogging of the windows when an evaporator is heated, which leads to abrupt evaporation of the water condensed at the surface, are avoided.

The method for operating the air conditioning unit according to the invention for the combined refrigeration plant and heat pump mode using the above mentioned features is characterized by that in refrigeration plant mode the air conditioning unit only the primary circuit and in heat pump mode both the secondary passage and the primary circuit are loaded with refrigerant. The air to be supplied to the passenger compartment is cooled and dehumidified in the evaporator and then heated in the heat exchanger which is configured as second gas cooler. Such heating is dependent on the recirculating air temperature and the refrigerant flow rate passing through the second throttling element adjustable in its cross-section arranged downstream of the second gas cooler, hence, also dependent on the refrigerant-side level of the temperature in the evaporator.

In heat pump mode, the heat exchanger established as evaporator, the first throttling element, the inner heat exchanger and the heat exchanger established as first gas cooler are passed by the refrigerant in opposite sense. That means that the portion of the primary circuit that comprises these components is passed in opposite direction compared to the refrigeration plant mode.

Decided advantages and features of the invention over the state-of-the-art essentially are: Simultaneous dehumidification and heating of the air of the passenger compartment;

reduced maximum heat output required for the heat pump by enabling recirculating operation; the air temperature upstream of the second gas cooler rises very fast after switch-on of the heat pump; improved dynamic behaviour and/or less complexity compared with other auxiliary heating systems with comparable functionality; during the optional use of an electrically powered compressor the heating capacity is available independent of the engine; reduced fuel consumption of the vehicle by use of the "free" ambient heat; the small number of active components (compressor, active switch-over valve, two externally adjustable expansion valves) results in cost-savings during manufacture of the air conditioning unit.

BRIEF DESCRIPTION OF THE DRAWING

The above and other objects and advantages of the invention will become readily apparent to those skilled in the art from reading the following description of an embodiment of the invention when considered in the light of the accompanying drawing which shows a circuit arrangement of an air conditioning unit for a combined refrigeration plant and heat pump mode of operation for a vehicle with a primary circuit and a secondary passage.

DETAILED DESCRIPTION OF THE PREFERRED EMBODIMENT

The following detailed description and appended drawing describe and illustrate an exemplary embodiment of the invention. The description and drawing serve to enable one skilled in the art to make and use the invention, and are not intended to limit the scope of the invention in any manner. In respect of the methods disclosed, the steps presented are exemplary in nature, and thus, the order of the steps is not necessary or critical.

The drawing illustrates a circuit arrangement of an air conditioning unit 1 for a combined refrigeration plant and heat pump mode of operation for a vehicle with a primary circuit and a secondary passage or circuit.

In the primary circuit, in a direction of a flow of a refrigerant indicated by a dashed line in a refrigeration plant mode, the following components are disposed and coupled to each other: a compressor 5, a first branch point such as an active switch-over valve 6, a first heat exchanger established as a first gas cooler 2, a fourth heat exchanger established as an inner heat exchanger 9, a first throttling element established as a bidirectionally passable throttle valve 11 having an adjustable cross-section, a second heat exchanger established as an evaporator 3, an entering point such as a passive switch-over valve 7, and an accumulator 8.

In a traditional refrigeration plant mode, only the primary circuit of the air conditioning unit 1 is passed by the refrigerant. First, for cooling an air fed into a passenger compartment, the refrigerant is compressed in the compressor 5 and then directed to the first heat exchanger established as a first gas cooler 2 by means of the active switch-over valve 6. In the first heat exchanger established as a first gas cooler 2, the refrigerant transmits surplus heat energy to the environment. Thereafter, the cooled refrigerant passes through the fourth heat exchanger established as an inner heat exchanger 9, wherein the starting point before the throttling of the refrigerant in a direction of lower temperatures is placed, which improves the refrigeration capacity of the air conditioning unit 1. Then, the refrigerant is expanded to the pressure level within the second heat exchanger established as an evaporator 3 using the bidirectionally passable throttle valve 11, which creates a two-phase mixture. The two-phase mixture is then evaporated in the second heat exchanger established as an evaporator 3, which cools the air to be fed into the passenger compartment to a desired temperature. After leaving the second heat exchanger established as an evaporator 3, the refrigerant flows over the passive switch-over valve 7 to the accumulator 8, where the liquid refrigerant still present due to incomplete evaporation is separated and stored. Finally, the refrigerant leaving the accumulator 8 is heated in the fourth heat exchanger established as an inner heat exchanger 9 and drawn and compressed again by the compressor 5. It is understood that the fourth heat exchanger established as an inner heat exchanger 9 and the accumulator 8 can be formed as an integral component 10 as desired, which facilitates minimized space requirements and manufacture costs.

In the refrigeration plant mode shown, the refrigerant passes through the primary circuit in a counter clockwise direction. However, it is understood that the refrigerant may pass through the primary circuit in other directions as desired.

The secondary passage includes two portions 15, 16. The first portion 15 extends from the active switch-over valve 6 to an entering point 14 of the primary circuit disposed between the second heat exchanger established as an evaporator 3 and the passive switch-over valve 7. In the first portion 15 of the secondary passage, in the direction of refrigerant flow, a third heat exchanger established as a second gas cooler 4 and a second throttling element 12 are disposed downstream the active switch-over valve 6. The second portion 16 of the secondary passage extends from a second branch point 13 disposed between the first heat exchanger established as a first gas cooler 2 and the active switch-over valve 6 to the passive switch-over valve 7.

In a heat pump mode indicated as a solid line, both portions 15, 16 of the secondary passage and the primary circuit of the air conditioning unit 1 are passed by the refrigerant. Initially, for heating the air to be fed into the passenger compartment, the refrigerant is compressed in the compressor 5 and then directed to the third heat exchanger established as a second gas cooler 4 by means of the active switch-over valve 6 over the first portion 15 of the secondary passage. In the third heat exchanger established as a second gas cooler 4, in contrast to the first heat exchanger established as a first gas cooler 2, the heat is not released to the environment, but used to heat the air to be fed into the passenger compartment. In the second throttling element 12, which is disposed downstream of the third heat exchanger established as a second gas cooler 4, the refrigerant is expanded from a compressor pressure level to a medium pressure level, which creates a two-phase mixture. By means of the medium pressure level, a refrigerant-side temperature level in the second heat exchanger established as an evaporator 3 is controlled. To militate against the second heat exchanger established as an evaporator 3 from icing, the temperature level in the second heat exchanger established as an evaporator 3 must not be reduced below 0° C. when the temperature upstream of the second heat exchanger established as an evaporator 3 is above 0° C. On the other hand, to prevent flash-fogging from developing, the temperature level in the second heat exchanger established as an evaporator 3 must not be above 0° C. when the air temperature upstream of the second heat exchanger established as an evaporator 3 is below 0° C. In the second heat exchanger established as an evaporator 3, the refrigerant is partly evaporated, whereby the air to be fed into the passenger compartment is cooled and dehumidified. The cooled and dehumidified air flows over the third heat exchanger established as a second gas cooler 4 and heated to a temperature level required to heat the passenger compartment. The refrigerant partly evaporated in the second heat exchanger established as an evaporator 3 is expanded in the first throttling element established as the bidirectionally passable throttle valve 11 to the pressure level in the first heat exchanger established as a first gas cooler 2. The bidirectionally passable throttle valve is passed in an opposite direction compared to the refrigeration plant mode of the air conditioning unit described above. In the first heat exchanger established as a first gas cooler 2 the refrigerant is further evaporated. After having reached the second branch point 13 the refrigerant passes the second portion 16 of the secondary passage, which extends to the passive switch-over valve 7. After passing the passive switch-over valve 7, the refrigerant passes the portion of the primary circuit that includes the accumulator 8, the fourth heat exchanger established as an inner heat exchanger 9, and the compressor 5.

In the heat pump mode shown, the refrigerant passes the two portions 15, 16 of the secondary passage in a clockwise direction. However, it is understood that the refrigerant may pass through the two portions 15, 16 of the secondary passage in other directions as desired.

The portion of the primary circuit with the second heat exchanger established as an evaporator 3, the first throttling element established as the bidirectionally passable throttle valve 11, the fourth heat exchanger established as an inner heat exchanger 9, and the first heat exchanger established as a first gas cooler 2 is also passed in a clockwise direction. The portion of the primary circuit with the accumulator 8, the fourth heat exchanger established as an inner heat exchanger 9 and the compressor 5 is passed in a counter-clockwise direction. However, it is understood that the two portions 15, 16 of the primary circuit can be passed in other directions as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air conditioning system comprising:
    a primary circuit including a compressor, a first heat exchanger for heat transmission from a refrigerant to the environment, a first throttling element, and a second heat exchanger for heat transmission to the refrigerant from air to be supplied to a passenger compartment, wherein the primary circuit includes a first segment extending from an outlet end of the compressor to the first heat exchanger, a second segment extending from the first heat exchanger to the second heat exchanger, and a third segment extending from the second heat exchanger to an inlet end of the compressor, wherein the first segment, the second segment, and the third segment are all separate and distinct from each other;
    a first secondary circuit portion extending from the primary circuit at a first branch point and reentering the primary circuit at a first entering point, wherein the first branch point is disposed on the first segment of the primary circuit and the first entering point is disposed on the third segment of the primary circuit, wherein the first secondary circuit portion includes a third heat exchanger for heat transmission from the refrigerant to air to be conditioned in the passenger compartment and a second throttling element; and
    a second secondary circuit portion extending from the primary circuit at a second branch point and reentering the primary circuit at a second entering point, wherein the second branch point is disposed on the first segment of the primary circuit between the first branch point and the first heat exchanger and wherein the second entering point is disposed on the third segment of the primary circuit between the first entering point and the inlet end of the compressor.

2. The air conditioning system according to claim 1, wherein the primary circuit includes a fourth heat exchanger for additional heating and cooling of the refrigerant.

3. The air conditioning system according to claim 2, further comprising an accumulator disposed between the second entering point and the fourth heat exchanger for separating and storing the refrigerant therein.

4. The air conditioning system according to claim 1, wherein the second heat exchanger is an evaporator and the third heat exchanger is a gas cooler, and wherein while in the heat pump mode the refrigerant flows from the third heat exchanger toward the first entering point and then from the first entering point toward the second heat exchanger.

5. The air conditioning system according to claim 1, wherein the first branch point is an active switch-over valve.

6. The air conditioning system according to claim 1, wherein the second entering point is a passive switch-over valve.

7. The air conditioning system according to claim 1, wherein while in the heat pump mode, the refrigerant flows from an outlet end of the compressor to the first branch point, through the first secondary circuit portion to the first entering point, from the first entering point to the second heat exchanger, from the second heat exchanger to the first throttling element, from the first throttling element to the first heat exchanger, from the first heat exchanger to the second branch point, through the second secondary circuit portion to the second entering point, and from the second entering point to the inlet end of the compressor.

8. A method for operating an air conditioning system for a combined refrigeration plant and heat pump mode of operation comprising the steps of:
    providing an air conditioner system including a primary circuit having a compressor, a first heat exchanger for heat transmission from a refrigerant to the environment, a first throttling element, and a second heat exchanger for heat transmission to the refrigerant from air to be supplied to a passenger compartment, wherein the primary circuit includes a first segment extending from an outlet end of the compressor to the first heat exchanger, a second segment extending from the first heat exchanger to the second heat exchanger, and a third segment extending from the second heat exchanger to an inlet end of the compressor, wherein the first segment, the second segment, and the third segment are all separate and distinct from each other; the air conditioner system further including a first secondary circuit portion and a second secondary circuit portion, the first secondary circuit portion extending from the primary circuit at a first branch point and reentering the primary circuit at a first entering point, wherein the first branch point is disposed on the first segment of the primary circuit and the first entering point is disposed on the third segment of the primary circuit, wherein the first secondary circuit portion includes a third heat exchanger for heat transmission from the refrigerant to air to be conditioned in the passenger compartment and a second throttling element; the second secondary circuit portion extending from the primary circuit at a second branch point and reentering the primary circuit at a second entering point, wherein the second branch point is disposed on the first segment of the primary circuit between the first branch point and the first heat exchanger and wherein the second entering point is disposed on the third segment of the primary circuit between the first entering point and the inlet end of the compressor, and wherein while in a heat pump mode the refrigerant flows through the first secondary circuit portion, the primary circuit, and the second secondary circuit portion, whereby the air to be supplied to the passenger compartment is cooled and dehumidified in the second heat exchanger and heated in the third heat exchanger.

9. The method according to claim 8, wherein the primary circuit includes a fourth heat exchanger for additional heating and cooling of the refrigerant.

10. The method according to claim 8, further comprising a step of controlling a refrigerant-side temperature within the second heat exchanger while in the heat pump mode.

11. The method according to claim 10, wherein control of the refrigerant-side temperature within the second heat exchanger is facilitated by a control of a flow cross-section of the second throttling element.

12. The method according to claim 8, wherein the second heat exchanger is an evaporator and the third heat exchanger is a gas cooler, wherein while in the heat pump mode the refrigerant flows from the third heat exchanger toward the first entering point and then from the first entering point toward the second heat exchanger.

* * * * *